United States Patent
Heitzmann

(10) Patent No.: US 7,651,558 B2
(45) Date of Patent: Jan. 26, 2010

(54) METHOD FOR MANUFACTURING PIGMENTED INKS

(75) Inventor: Daniel Heitzmann, L'Isle d'Abeau (FR)

(73) Assignee: Agfa Graphics NV, Mortsel (BE)

( * ) Notice: Subject to any disclaimer, the term of this patent is extended or adjusted under 35 U.S.C. 154(b) by 0 days.

(21) Appl. No.: 12/299,502

(22) PCT Filed: Apr. 10, 2007

(86) PCT No.: PCT/EP2007/053469

§ 371 (c)(1),
(2), (4) Date: Nov. 4, 2008

(87) PCT Pub. No.: WO2007/131841

PCT Pub. Date: Nov. 22, 2007

(65) Prior Publication Data

US 2009/0095201 A1  Apr. 16, 2009

Related U.S. Application Data

(60) Provisional application No. 60/747,450, filed on May 17, 2006.

(30) Foreign Application Priority Data

May 11, 2006  (EP)  .................................. 06113790

(51) Int. Cl.
*C09D 11/00* (2006.01)
*C09D 11/02* (2006.01)

(52) U.S. Cl. .................... 106/31.6; 106/31.85; 106/499

(58) Field of Classification Search ................. 106/31.6, 106/31.85, 499
See application file for complete search history.

(56) References Cited

U.S. PATENT DOCUMENTS

| 5,714,993 | A | 2/1998 | Keoshkerian et al. | |
| 6,052,195 | A * | 4/2000 | Mestha et al. | 356/425 |
| 6,679,598 | B2 * | 1/2004 | Kato et al. | 106/31.6 |
| 6,863,386 | B2 | 3/2005 | Hatada et al. | |
| 6,916,862 | B2 * | 7/2005 | Ota et al. | 523/200 |
| 7,537,650 | B2 * | 5/2009 | Szajewski et al. | 106/31.6 |
| 2002/0088375 | A1 | 7/2002 | Komatsu et al. | |
| 2005/0124726 | A1 * | 6/2005 | Yatake et al. | 523/160 |

FOREIGN PATENT DOCUMENTS

| EP | 0 753 552 A1 | 1/1997 |
| EP | 1 086 998 A2 | 3/2001 |
| JP | 09-227810 A | 9/1997 |

OTHER PUBLICATIONS

Official Communication issued in International Patent Application No. PCT/EP2007/053469, mailed on Jun. 19, 2007.

* cited by examiner

*Primary Examiner*—Helene Klemanski
(74) *Attorney, Agent, or Firm*—Keating Bennett, LLP

(57) ABSTRACT

A method for manufacturing a pigmented ink includes the steps of a) preparing a pigment dispersion in a dispersing installation; b) charging the dispersing installation with a washing liquid; c) discharging the washing liquid from the dispersing installation; and d) adding the discharged washing liquid to the pigment dispersion.

13 Claims, No Drawings

METHOD FOR MANUFACTURING PIGMENTED INKS

CROSS-REFERENCE TO RELATED APPLICATIONS

This application is a 371 National Stage Application of PCT/EP2007/053469, filed Apr. 10, 2007. This application claims the benefit of U.S. Provisional Application No. 60/747,450, filed May 17, 2006, which is incorporated by reference herein in its entirety. In addition, this application claims the benefit of European Application No. 06113790.7, filed May 11, 2006, which is also incorporated by reference herein in its entirety.

BACKGROUND OF THE INVENTION

1. Field of the Invention

The present invention relates to a method for manufacturing pigmented inks of consistent quality and producing limited or no waste.

2. Description of the Related Art

Pigment dispersions are used in inks for producing monochrome or multicolored images. In the printing business, it is important that the inks are of consistent quality in order to obtain accurate reproduction of the image on paper or polymeric media. Color images are often produced with a CMYK ink set consisting of a cyan, a magenta, a yellow and a black ink each including one or more dispersed pigments.

Pigment dispersions are made using a dispersant. A dispersant is a substance for promoting the formation and stabilization of a dispersion of pigment particles in a dispersion medium. Dispersants are generally surface-active materials having an anionic, cationic or non-ionic structure. The presence of a dispersant substantially reduces the required dispersing energy. Dispersed pigment particles may have a tendency to re-agglomerate after the dispersing operation due to mutual attraction forces. The use of dispersants also counteracts the re-agglomeration tendency of the pigment particles.

Generally, the pigment dispersions are manufactured in a batch process and different pigment dispersions often use the same dispersing installation. In between two batches of pigment dispersions employing different pigments, dispersants and/or dispersion media, the dispersion installation has to be cleaned to avoid hue shifts leading to inconsistent quality of inks.

U.S. Pat. No. 6,863,386 (RICOH) discloses a method for washing the ink manufacturing apparatus including charging the mixing vessel with a washing liquid, circulating the washing liquid through the ink manufacturing apparatus, and then discharging the washing liquid from the ink manufacturing apparatus. The discharged washing liquid is treated as waste.

EP 753552 A (TOYO INK) and JP 09-227810 (TOYO INK) disclose salt milling an organic pigment in the presence of a water-soluble inorganic salt, followed by washing the pigment in water to remove the inorganic salt to produce a processed pigment, and dispersing the obtained pigment in an aqueous liquid to obtain an inkjet ink. In this process, a determination of concentration is required to obtain consistent inkjet ink.

U.S. 2002/0088375 (SEIKO EPSON) discloses a method for manufacturing a pigment dispersed liquid, including at least: Step A of introducing a hydrophilic dispersibility-imparting group directly and/or via another atomic group to the surface of pigment particles; Step B of dispersing the pigment obtained in Step A in an aqueous medium; and Step C of conducting a refining treatment of the dispersed liquid obtained in Step B. Ultrafiltration is used in Step C wherein the pigment concentration is adjusted by adding ion exchange water.

U.S. Pat. No. 5,714,993 (XEROX) discloses a method of imaging including: jetting with a liquid jet an ink jettable toner composition including a liquid carrier vehicle and stabilized core particles including resin, colorant, and a stabilizer component which is covalently bonded to the core particles, in a predetermined pattern onto a receiving member to form an image; and fixing the image to a receiver by heating or irradiating the image and/or the receiver at from about 40° C. to about 150° C. The preparation of stabilized carbon black suspensions involves rinsing with water. The pigment concentration in the stock suspension for preparing ink formulations is reduced by approximately 25%.

Along with the discharged washing liquid, certain amounts of pigments are wasted. Correction of the amounts of the components to complete the ink composition is then necessary to obtain consistent quality, leading to extra measurements and manipulations. Measurement of the color strength of an ink is cumbersome and very time consuming and the accuracy of the measurement is also dependent on the color and strength stability of the standard ink. Even with careful control, these standard inks can vary from batch to batch and tend to flocculate or settle in time, leading to poor test repeatability and difficulty in accurately matching the ink being made to a standard ink.

The in-between cleaning of the pigment dispersing apparatus results in large amounts of washing liquids, representing financial penalties not only due to the cost of the raw materials wasted, but also due to the cost for treating these waste solutions and the loss in production time and efficiency. Therefore, it would be desirable to have a simple and fast method for manufacturing pigmented inks of consistent quality and producing limited or no waste.

SUMMARY OF THE INVENTION

In order to overcome the problems described above, preferred embodiments of the present invention provide a method for manufacturing pigmented inks of consistent quality in a simple and fast way.

It is a further advantage of the preferred embodiments of the present invention to provide a method for manufacturing pigmented inks producing limited or no waste.

Further advantages of the preferred embodiments of the present invention will become apparent from the description hereinafter.

It has been discovered that inks of consistent quality can be made from pigment dispersions and washing liquids composed of at least one liquid component intended to be used in completing the ink formulation, thereby producing minimum waste.

Advantages according to a preferred embodiment of the present invention have been achieved with a method for manufacturing a pigmented ink including the steps of:

a) preparing a pigment dispersion in a dispersing installation;

b) charging the dispersing installation with a washing liquid;

c) discharging the washing liquid from the dispersing installation; and d) adding the discharged washing liquid to the pigment dispersion.

Other features, elements, steps, characteristics and advantages of the present invention will become more apparent from the following detailed description of preferred embodiments of the present invention.

DETAILED DESCRIPTION OF THE PREFERRED EMBODIMENTS

Definitions

The term "dye", as used in the preferred embodiments of the present invention, means a colorant having a solubility of 10 mg/L or more in the medium in which it is applied and under the ambient conditions pertaining thereto.

The term "pigment" is defined in DIN 55943, herein incorporated by reference, as an inorganic or organic, chromatic or achromatic coloring agent that is practically insoluble in the application medium under the pertaining ambient conditions, hence having a solubility of less than 10 mg/L therein.

The terms "aqueous" and "water-based" as used in the preferred embodiments of the present invention mean that the main solvent or all of the solvent is water.

The term "solvent-based" as used in the preferred embodiments of present invention means that the main solvent or all of the solvent includes of one or more organic solvents and/or oils.

The term "UV" is used in the preferred embodiments of the present application as an abbreviation for ultraviolet radiation.

The term "ultraviolet radiation" as used in the preferred embodiments of the present invention means electromagnetic radiation in the wavelength range of 100 to 400 nanometers.

The term "actinic radiation" as used in the preferred embodiments of the present invention means electromagnetic radiation capable of initiating photochemical reactions.

The term "Norrish Type I initiator" as used in the preferred embodiments of the present invention means an initiator which cleaves after excitation, yielding the initiating radical immediately.

The term "Norrish Type II initiator" as used in the preferred embodiments of the present invention means an initiator which in its excited state forms free radicals by hydrogen abstraction or electron extraction from a second compound that becomes the actual initiating free radical.

The term "photo-acid generator" as used in the preferred embodiments of the present invention means an initiator which generates an acid or hemi-acid upon exposure to actinic radiation.

The term "thermal initiator" as used in the preferred embodiments of the present invention means an initiator which generates initiating species upon exposure to heat.

The term "wt %" is used in the preferred embodiments of the present invention as an abbreviation for % by weight.

Methods for Manufacturing Inks

The method for manufacturing a pigmented ink according to a preferred embodiment of the present invention includes the steps of:

a) preparing a pigment dispersion in a dispersing installation;

b) charging the dispersing installation with a washing liquid;

c) discharging the washing liquid from the dispersing installation; and d) adding the discharged washing liquid to the pigment dispersion.

The steps b), c) and d) are preferably repeated at least once.

In a preferred embodiment, the steps b), c) and d) are repeated two, three or four times, most preferably the steps b), c) and d) are repeated four times.

In one preferred embodiment, the washing liquid is sent through the dispersion installation and directly discharged.

In a preferred embodiment, the washing liquid is circulated over the dispersion installation at least once before being discharged.

After preparation, the pigment dispersion is usually not yet suitable for a particular application. Other ingredients such as surfactants, solvents, photo-initiators, biocides, hardeners, and the like may be required to complete the ink formulation. Before the ink is bottled into cartridges, drums or jerry-cans, a step of filtering the ink is usually conducted.

In preparing the inkjet ink, it is preferred that one or more degassing steps are performed at one time or another for removing air or gas bubbles from the ink. Degassing is preferably performed by heating and/or reduced pressure. The degassing step(s) can be performed on the concentrated pigment dispersion and/or on the final inkjet ink composition.

Dispersing Installations

The dispersing installation for preparing the pigment dispersion may include a single dispersing apparatus, but may include more than one apparatus. A preferred dispersing installation includes a mixing apparatus and a dispersing apparatus. Usually pigment, dispersant, and dispersion media are combined in a mixing apparatus used for the de-aggregation and the wetting of the pigments.

In a preferred embodiment, the mixing apparatus is selected from a group including a pressure kneader, an open kneader, a planetary mixer and a dissolver. The step wherein pigment, dispersant, and dispersion media are combined in a mixing apparatus is usually referred to as the pre-dispersing step.

In a preferred embodiment, the dispersing apparatus is selected from a group including horizontal mills, vertical mills, attritors, vibratory mills, ball mills, planetary ball mills, pearl mills, colloid mills, hammer mills, pin disk mills, double rollers, bead mills, ultrasonic mills, paint conditioners and triple rollers. These mills may contain various grinding media. Suitable grinding media include sand, glass beads, ceramic beads, metal beads, polymeric beads and the like. Non-media mills can also be used, such as high shear dispersers, high-pressure fluid impingement dispersers, such as Microfluidizers from Microfluidics International Corporation, and the like. It is preferred to use a dispersion installation that is controlled by a computer.

The dispersing installation can include the aforementioned apparatus, or a combination of them, working in parallel or in series, simultaneously or consecutively.

A specific method for manufacturing the inkjet ink includes the step of subjecting pigments to dispersion by a planetary ball mill or sand mill using ceramic beads of 0.01-1.0 mm in particle diameter. It is preferred that in the case of using the planetary ball mill, the dispersion is carried out at an acceleration of 5-50 G and in the case of the sand mill, it is carried out at a peripheral speed of 5-20 m/s with a filling rate of the ceramic beads of 50-90%.

The time necessary for the dispersing step is influenced by the type of the dispergator, energy efficiency, the stress applied to the dispersion and the like and hence is not particularly limited. The time, however, should be long enough to provide satisfactory dispersion and to cause satisfactory interaction between the pigment(s) and the dispersant(s). In general, the time is generally determined according to specifications of the device used.

For example, when a sand mill (manufactured by Yasukawa Seisakusho) is used, the components are dispersed together with glass beads (diameter: 1.7 mm, amount: 1.5 times (by weight) larger than the mixture) at room temperature for about one hour. When a Mini mill 100 (Eiger Machinery Inc., Bensenbille Ill.) is used, the dispersing step is carried out at 3,000 to 4,000 rpm for about 2 hours.

Optimum grinding time and proper pigment to dispersant ratio are needed to reduce the particle size of the pigment to provide suitable pigment dispersions with desired particle size distribution. Grinding or mixing time generally ranges from about 10 minutes to about 24 hours, preferably from about 10 minutes to about 8 hours, and most preferably from about 15 minutes to about 5 hours, depending on the mixing conditions. The pigment dispersion thus obtained may be centrifuged at a speed up to 20,000 rpm and filtered to provide a uniform particle distribution in the ink and to remove unstable larger particles, particularly of pigment. This centrifuge process is optional and the ink may be filtered subsequent to mixing the pigment dispersion with the other ink components. Filtration allows removal of undesired large particles which may clog the channel or nozzle opening.

In another preferred embodiment, the pigment dispersion may be prepared using ultrasonic energy as the sole dispersing technique or in addition to another dispersing technique, for example, a pigment dispersion prepared by a pearl mill preceded by an ultrasonic treatment or vice versa.

In designing the dispersing installation, dead zones in the tubing and dispersing equipment should be avoided as the limited flow in these areas reduces the cleaning action by the washing liquids.

The pigment dispersion may also be prepared by precipitation. For example, a pigment having at least one carboxylic acid group is first solubilized in the dispersion medium by increasing the pH above 9 and subsequently the solubilized pigment precipitated in the presence of the dispersant by addition of an acid. In another precipitation method, the pigments are solubilized by one or more suitable organic solvents and precipitated in the presence of the dispersant in a dispersion medium wherein the pigment is insoluble.

If more than one pigment is present in the pigmented ink, then pigment dispersions may be made by co-milling the pigments or by dispersing each pigment separately. In the latter case, it is possible to charge the washing liquid to the dispersing installation after milling the last pigment of the ink.

Washing Liquids

The washing liquid used in a preferred method of the present invention includes at least one liquid component of the ink. When the ink contains different liquid components, a mixture of liquid components may be used for the washing liquid. In repeating the cleaning of the dispersing installation, the washing liquid may be the same or different. For example, the first time a washing liquid containing one liquid component may be used, and for the second washing liquid a different liquid component or a mixture of liquid components may be used. Possible washing liquids are listed here below under "Dispersion Media and Liquid Components of the Ink".

The washing liquid may also contain other solid ink ingredients, but in a preferred embodiment, the washing liquid includes a single liquid component. The liquid component depends on the ink type and can, for example, be water for an aqueous ink, an organic solvent for a solvent based ink, and a monomer for radiation curable ink. In switching from one type of ink to another, e.g., from an aqueous ink to a radiation curable ink, after the last washing liquid for the aqueous ink, it is preferable to use a washing liquid including a liquid component from the radiation curable ink and discharging it before commencing the dispersion of the pigments of the radiation curable ink.

In another preferred embodiment, one or more washing liquids, used as liquid component(s) in the ink, are used to clean the dispersion installation and added to the pigment dispersion, while a final washing liquid may be a different liquid component not present in the ink and wasted instead of adding to the pigment dispersion.

The washing liquid preferably has a viscosity that is suitable for cleaning the dispersing installation using sprayers. Cleaning by mechanical force may be combined with the sprayers.

Pigment Dispersions and Inks

The pigmented dispersion according to a preferred embodiment of the present invention contains at least three components: (i) a pigment, (ii) a dispersant, and (iii) a dispersion medium.

The pigments are preferably dispersed using a polymeric dispersant. Polymeric dispersants contain in one part of the molecule so-called anchor groups, which adsorb onto the pigments to be dispersed. In a spatially separate part of the molecule, polymeric dispersants have a polymer chain which sticks out and whereby pigment particles are made compatible with the dispersion medium, i.e., stabilized.

The pigment particles in an ink should be sufficiently small, e.g., to permit free flow of an inkjet ink containing such pigment particles through the inkjet printing device, especially at the ejecting nozzles. It is also desirable to use small particles for maximum color strength.

The average particle size of the pigment in the ink should be between 0.005 µm and 15 µm. Preferably, the average pigment particle size is between 0.005 and 5 µm, more preferably between 0.005 and 1 µm, and particularly preferably between 0.005 and 0.3 µm. Larger pigment particle sizes may be used as long as the advantages and benefits of the preferred embodiments of the present invention are achieved.

The pigment is preferably used in the ink in an amount of 0.1 to 20 wt %, more preferably 0.3 to 10 wt % based on the total weight of the ink. Therefore, the pigment dispersion contains the pigment in a higher concentration, typically 10 to 30 wt % based on the total weight of the pigment dispersion.

The surface tension of the pigmented inkjet inks is preferably between 30 and 60 mN/m. The viscosity of the pigmented inkjet ink is preferably less than 100 mPa·s at 30° C. The viscosity of the pigmented inkjet ink is preferably less than 30 mPa·s, more preferably less than 15 mPa·s, and most preferably between 1 and 10 mPa·s all measured at a shear rate of $100\ s^{-1}$ and a jetting temperature between 10 and 70° C.

The pigmented ink manufactured by a method according to a preferred embodiment of the present invention may further contain at least one surfactant.

The pigmented ink manufactured by a method according to a preferred embodiment of the present invention may further contain at least one biocide.

The pigmented ink manufactured by a method according to a preferred embodiment of the present invention may contain at least one humectant to prevent the clogging of the nozzle, due to its ability to slow down the evaporation rate of ink.

The pigmented ink manufactured by a method according to a preferred embodiment of the present invention is preferably an inkjet ink selected from a group including an organic solvent based, an oil based, and a curable pigmented inkjet ink. The curable pigmented inkjet ink is preferably radiation curable.

The curable pigmented ink may contain monomers, oligomers and/or prepolymers possessing different degrees of functionality as liquid components. A mixture including combinations of mono-, di-, tri- and/or higher functionality monomers, oligomers or prepolymers may be used. A catalyst called an initiator for initiating the polymerization reaction may be included in the curable pigmented dispersion but is preferably added to the curable pigmented inkjet ink. The initiator can be a thermal initiator, but is preferably a photo-initiator. The photo-initiator requires less energy to activate than the monomers, oligomers and/or prepolymers to form the polymer. The photo-initiator suitable for use in the curable pigment dispersion may be a Norrish type I initiator, a Norrish type II initiator or a photo-acid generator.

Pigments

The pigmented ink manufactured with a method according to a preferred embodiment of the present invention contains at least one pigment, but a combination of a pigment with two or more pigments and/or one or more dyes may be used. The pigment can also be a precipitated dye having at least one carboxylic acid group or a salt thereof.

The pigment can be black, white, cyan, magenta, yellow, red, orange, violet, blue, green, brown, mixtures thereof, and the like.

The pigment may be chosen from those disclosed by HERBST, Willy, et al., Industrial Organic Pigments, Production, Properties, Applications, 3rd Edition, Wiley-VCH, 2004, ISBN 3527305769.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254 and 264.

Particular preferred pigments are C.I. Pigment Violet 1, 2, 19, 23, 32, 37 and 39.

Particular preferred pigments are C.I. Pigment Blue 15:1, 15:2, 15:3, 15:4, 16, 56, 61 and (bridged) aluminum phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments also include mixed crystals of the above particular preferred pigments. A commercially available example is Cinquasia Magenta RT-355-D from Ciba Specialty Chemicals, which is a mixed crystal of C.I. Pigment Violet 19 and C.I. Pigment Red 202.

For the black ink, suitable pigment materials include carbon blacks such as Regal 400R, Mogul L, Elftex 320 from Cabot Co., or Carbon Black FW18, Special Black 250, Special Black 350, Special Black 550, Printex 25, Printex 35, Printex 55, Printex 150T from DEGUSSA Co., and C.I. Pigment Black 7 and C.I. Pigment Black 11.

It is also possible to make mixtures of pigments in one pigment dispersion. For inkjet applications often a neutral black inkjet ink is preferred and can be obtained, for example, by mixing a black pigment and a cyan pigment into the ink. The inkjet application may also require one or more spot colors. Silver and gold are often desired colors for inkjet poster printing and point-of-sales displays. Also, many inorganic pigments can be advantageously dispersed according to the preferred embodiments of the present invention. Particular preferred pigments are C.I. Pigment Metal 1, 2 and 3. Titanium dioxide is a preferred pigment for a white ink.

Pigment particles in pigmented inkjet ink should be sufficiently small to permit free flow of the ink through the inkjet printing device, especially at the ejecting nozzles. It is also desirable to use small particles for maximum color strength and to slow down sedimentation.

The average particle size of the pigment in the pigmented inkjet ink should be between 0.005 and 15 µm. Preferably, the average pigment particle size is between 0.005 and 5 µm, more preferably between 0.005 and 1 µm, particularly preferably between 0.005 and 0.3 µm and most preferably between 0.040 and 0.150 µm. Larger pigment particle sizes may be used as long as the advantages and benefits of the present invention are achieved.

Dispersants

The dispersant used in the pigment dispersion of a method according to a preferred embodiment of the present invention has to meet particularly high requirements. Inadequate dispersing manifests itself as increased viscosity in liquid systems, loss of brilliance and hue shifts. Particularly good dispersion of the pigment particles is required in the case of inks for use in inkjet printers so as to ensure unimpeded passage of the pigment particles through the nozzles of the print head which are usually only a few micrometers in diameter. In addition, pigment particle agglomeration and the associated blockage of the printer nozzles has to be avoided in the standby periods of the printer. The dispersant can be a polymeric dispersant, a surfactant or a combination of both, but is preferably a polymeric dispersant.

The dispersant is used in the pigment dispersion in an amount of 5 to 200 wt %, preferably 10 to 100 wt % based on the weight of the pigment.

The polymeric dispersant can be non-ionic, anionic or cationic in nature; salts of the ionic dispersants can also be used.

The polymeric dispersant preferably has a polymerization degree DP between 5 and 1,000, more preferably between 10 and 500 and most preferably between 10 and 100.

The polymeric dispersant preferably has a number average molecular weight Mn between 500 and 30,000, more preferably between 1,500 and 10,000.

The polymeric dispersant preferably has an average molecular weight Mw smaller than 100,000, more preferably smaller than 50,000 and most preferably smaller than 30,000.

The polymeric dispersant preferably has a polymeric dispersity PD smaller than 2, more preferably smaller than 1.75 and most preferably smaller than 1.5.

Polymeric dispersants are used in inkjet inks in order to deliver a good dispersion of the pigment particles, but more important to ensure high dispersion stability, particularly at higher temperatures, since jetting temperature of inkjet inks can be up to 70° C.

Suitable polymeric dispersants include copolymers of two or more (three, four, five or even more) monomers. The properties of polymeric dispersants depend on both the nature of the monomers and their distribution in the polymer. Copolymers suitable as dispersants may be obtained by randomly polymerizing monomers (e.g., monomers A and B polymerized into ABBAABAB); alternating polymerizing monomers (e.g., monomers A and B polymerized into ABABABAB); gradient (tapered) polymerizing polymers (e.g., monomers A and B polymerized into AAABAABBABBB); polymerizing monomers into block copolymers (e.g., monomers A and B polymerized into AAAAABBBBBB) wherein the block length of each of the blocks (2, 3, 4, 5 or even more blocks) is important for the dispersion capability of the polymeric dispersant. Mixed forms of the monomer distributions above can be used, e.g., blocky gradient copolymers as well as graft copolymers consisting of a polymeric backbone with side chains attached to the backbone.

Suitable polymeric dispersants may have a linear polymer architecture, a comb/branched polymer architecture, a star polymer architecture or a dendritic polymer architecture. Comb/branched polymers have side branches of linked monomer molecules protruding from various central branch points along the main polymer chain (at least 3 branch points). Star polymers are branched polymers in which three or more either similar or different linear homopolymers or copolymers are linked together to a single core. Dendritic polymers include the classes of dendrimers and hyperbranched polymers. Dendrimers have well-defined monodisperse structures wherein all branch points are used (multi-step synthesis), while hyperbranched polymers are polymers having a plurality of branch points and multifunctional branches that lead to further branching with polymer growth (one-step polymerization process). A general review on the architecture of polymers is given by ODIAN, George, Principles of Polymerization, 4th Edition, Wiley-Interscience, 2004, pp. 1-19.

Suitable polymeric dispersants can be prepared via addition or condensation type polymerizations. Suitable polymerization methods are described by ODIAN, George, Principles of Polymerization, 4th Edition, Wiley-Interscience, 2004, pp. 39-306. The monomers and/or oligomers used to prepare the polymeric dispersant can be any monomer and/or oligomer found in the Polymer Handbook, Vol 1+2, 4th Edition, edited by BRANDRUP, J., et al., Wiley-Interscience, 1999.

The design of polymeric dispersants for inkjet inks is discussed in SPINELLI, Harry J., Polymeric Dispersants in Ink Jet technology, *Advanced Materials,* 1998, Vol. 10, No. 15, pp. 1215-1218.

A detailed list of suitable polymeric dispersants is disclosed by MC CUTCHEON, Functional Materials, North American Edition, Glen Rock, N.J.: Manufacturing Confectioner Publishing Co., 1990, pp. 110-129.

The pigmented dispersion can contain one polymeric dispersant or a mixture of two or more polymeric dispersants to improve the dispersion stability further. Also, surfactants can be used as pigment dispersants, thus a combination of a polymeric dispersant with a surfactant is also possible.

The polymeric dispersant is used in the pigmented dispersion in an amount preferably of 2 to 600 wt %, more preferably 5 to 200 wt % based on the weight of the pigment.

Polymers useful as pigment dispersants include naturally occurring polymers, and specific examples thereof include: proteins, such as glue, gelatine, casein, and albumin; naturally occurring rubbers, such as gum arabic and tragacanth; glucosides such as saponin; alginic acid and alginic acid derivatives, such as propylene glycol alginate; and cellulose derivatives, such as methyl cellulose, carboxymethyl cellulose and ethylhydroxy cellulose; wool and silk, and synthetic polymers.

Suitable copolymeric dispersants include acrylic acid/acrylonitrile copolymer, vinyl acetate/acrylic ester copolymer, acrylic acid/acrylic ester copolymer, styrene/acrylic acid copolymer, styrene/methacrylic acid copolymer, styrene/methacrylic acid/acrylic ester copolymer, styrene/α-methylstyrene/acrylic acid copolymer, styrene/α-methylstyrene/acrylic acid/acrylic ester copolymer, styrene/maleic acid copolymer, styrene/maleic anhydride copolymer, vinylnaphthalene/acrylic acid copolymer, vinylnapthalene/maleic acid copolymer, vinyl acetate/ethylene copolymer, vinyl acetate/fatty acid/ethylene copolymer, vinyl acetate/maleic ester copolymer, vinyl acetate/crotonic acid copolymer, vinyl acetate/acrylic acid copolymer.

Suitable chemistries of copolymeric dispersants also include:
 copolymers which are the product of a condensation process of poly(ethylene imine) with a carboxylic acid terminated polyester (made by addition polymerization);
 copolymers which are the product of a reaction of multifunctional isocyanate with a mono-substituted active H-containing compound like polyester, with a compound containing two active hydrogens (like a polyether) which serves as a cross-linking agent and the residual isocyanates being transformed to carbamates or urea with compounds containing active hydrogens and a N-containing ring.

Commercial examples of polymeric dispersants suitable for aqueous inkjet inks include DISPERBYK™ dispersants available from BYK CHEMIE GMBH; SOLSPERSE™ dispersants available from NOVEON; TEGO™ DISPERS™ dispersants from DEGUSSA; EDAPLAN™ dispersants from MÜNZING CHEMIE; ETHACRYL™ dispersants from LYONDELL; GANEX™ dispersants from ISP; DISPEX™ and EFKA™ dispersants from CIBA SPECIALTY CHEMICALS INC; DISPONER™ dispersants from DEUCHEM; and JONCRYL™ dispersants from JOHNSON POLYMER.

Commercial examples of polymeric dispersants suitable for non-aqueous inkjet inks include Solsperse™ dispersants from NOVEON, Efka™ dispersants from CIBA SPECIALTY CHEMICALS INC and Disperbyk™ dispersants from BYK CHEMIE GMBH.

Preferred dispersants for solvent based pigmented dispersions are Solsperse™ 32000 and 39000 from NOVEON.

Preferred dispersants for oil based pigmented dispersions are Solsperse™ 11000, 11200, 13940, 16000, 17000 and 19000 from NOVEON.

Preferred dispersants for UV-curable pigmented dispersions are Solsperse™ 32000 and 39000 dispersants from NOVEON.

Dispersion Media and Liquid Components of the Ink

The dispersion medium used in the pigment dispersion according to a preferred embodiment of the present invention is a liquid. The dispersion medium may include water and/or organic solvent(s). All the liquids below may also be added to the pigment dispersion afterwards to complete the ink and hence can be selected as a washing liquid.

In one preferred embodiment, the dispersion medium includes organic solvent(s). Suitable organic solvents include alcohols, ketones, esters, ethers, glycols and polyglycols and derivatives thereof, lactones, N-containing solvents such as amides, saturated hydrocarbons and unsaturated hydrocarbons. Preferably mixtures of one or more of these solvents are used.

Examples of suitable alcohols include methyl alcohol, ethyl alcohol, n-propyl alcohol, isopropyl alcohol, n-butyl alcohol, heptyl alcohol, octyl alcohol, cyclohexyl alcohol, benzyl alcohol, phenylethyl alcohol, phenylpropyl alcohol, furfuryl alcohol, anise alcohol and fluoroalcohols.

Examples of suitable ketones include acetone, methyl ethyl ketone, methyl n-propyl ketone, methyl isopropyl ketone, methyl n-butyl ketone, methyl isobutyl ketone, methyl n-amyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclohexanone, methylcyclohexanone and isophorone, 2,4-pentanedione and hexafluoroacetone.

Examples of suitable esters include methyl acetate, ethyl acetate, n-propyl acetate, isopropyl acetate, n-butyl acetate, isobutyl acetate, hexyl acetate, octyl acetate, benzyl acetate, phenoxyethyl acetate, ethyl phenyl acetate, methyl lactate, ethyl lactate, propyl lactate, butyl lactate; methyl propionate, ethyl propionate, benzyl propionate, ethylene carbonate, propylene carbonate, amyl acetate, ethyl benzoate, butyl benzoate, butyl laurate, isopropyl myristate, isopropyl palmitate, triethyl phosphate, tributyl phosphate, diethyl phthalate, dibutyl phthalate, diethyl malonate, dipropyl malonate, diethyl succinate, dibutyl succinate, diethyl glutarate, diethyl adipate, dibutyl adipate and diethyl sebacate.

Examples of suitable ethers include butyl phenyl ether, benzyl ethyl ether, hexyl ether, diethyl ether, dipropyl ether, tetrahydrofuran and dioxane.

Examples of suitable glycols and polyglycols include ethylene glycol, diethylene glycol, triethylene glycol, propylene glycol, dipropylene glycol and tripropylene glycol.

Examples of suitable glycol and polyglycol derivatives include ethers such as alkylene glycol mono alkyl ethers, alkylene glycol dialkyl ethers, polyalkylene glycol nono alkyl ethers, polyalkylene glycol dialkyl ethers and esters of the preceding glycol ethers such as acetate and propionate esters, in case of dialkyl ethers only one ether function (resulting in mixed ether/ester) or both ether functions can be esterized (resulting in dialkyl ester).

Examples of suitable alkylene glycol mono alkyl ethers include ethylene glycol mono methyl ether, ethylene glycol mono ethyl ether, ethylene glycol mono propyl ether, ethylene glycol mono butyl ether, ethylene glycol mono hexyl ether, ethylene glycol mono 2-ethyl-hexyl ether, ethylene glycol mono phenyl ether, propylene glycol mono methyl ether, propylene glycol mono ethyl ether, propylene glycol mono n-propyl ether, propylene glycol mono n-butyl ether, propylene glycol mono iso-butyl ether, propylene glycol mono t-butyl ether and propylene glycol mono phenyl ether.

Examples of suitable alkylene glycol dialkyl ethers include ethylene glycol dimethyl ether, ethylene glycol diethyl ether, ethylene glycol methyl ethyl ether, ethylene glycol dibutyl ether, propylene glycol dimethyl ether, propylene glycol diethyl ether and propylene glycol dibutyl ether.

Examples of suitable polyalkylene glycol mono alkyl ethers include diethylene glycol mono methyl ether, diethylene glycol mono ethyl ether, diethylene glycol mono-n-propyl ether, diethylene glycol mono n-butyl ether, diethylene glycol mono hexyl ether, triethylene glycol mono methyl ether, triethylene mono ethyl ether, triethylene glycol mono butyl ether, dipropylene mono methyl ether, dipropylene glycol mono ethyl ether, dipropylene glycol n-propyl ether, dipropylene glycol mono n-butyl ether, dipropylene mono t-butyl ether, tripropylene glycol mono methyl ether, tripropylene glycol mono ethyl ether, tripropylene glycol mono n-propyl ether and tripropylene glycol mono n-butyl ether.

Examples of suitable polyalkylene glycol dialkyl ethers include diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol methyl ethyl ether, triethylene glycol methyl ethyl ether, tetraethylene glycol methyl ethyl ether, diethylene glycol di-n-propyl ether, diethylene glycol di-iso-propyl ether, dipropylene glycol dimethyl ether, dipropylene glycol diethyl ether, dipropylene di n-propyl ether, dipropylene di t-butyl ether, tripropylene glycol dimethyl ether and tripropylene glycol diethyl ether.

Examples of suitable glycol esters include ethylene glycol monomethyl ether acetate, ethylene glycol monoethyl ether acetate, ethylene glycol monopropyl ether acetate, ethylene glycol monobutyl ether acetate, diethylene glycol monoethyl ether acetate, diethylene glycol monobutyl ether acetate, propylene glycol monomethyl ether acetate, propylene glycol monoethyl ether acetate, dipropylene glycol monomethyl ether acetate and propylene glycol monomethyl ether propionate.

Suitable commercial glycol ether solvents include Cellosolve™ solvents and Carbitol™ solvents from UNION CARBIDE, Ektasolve™ solvents from EASTMAN, Dowanol™ solvents from DOW, Oxitoll™ solvents, Dioxitoll™ solvents, Proxitoll™ solvents and Diproxitoll™ solvents from SHELL CHEMICAL and Arcosolv™ solvents from LYONDELL.

Lactones are compounds having a ring structure formed by ester bonds and can be of the γ-lactone (5-membered ring structure), δ-lactone (6-membered ring structure) or ε-lactone (7-membered ring structure) types. Suitable examples of lactones include γ-butyrolactone, γ-valerolactone, γ-hexylactone, γ-heptalactone, γ-octalactone, γ-nonalactone, γ-decalactone, γ-undecalactone, δ-valerolactone, δ-hexylactone, δ-heptalactone, δ-octalactone, δ-nonalactone, δ-decalactone, δ-undecalactone and ε-caprolactone.

Suitable examples of N-containing organic solvents include 2-pyrrolidone, N-methylpyrrolidone, N,N-dimethylacetamid, N,N-dimethylformamid, acetonitril and N,N-dimethyldodecanamide.

Examples of suitable hydrocarbons include saturated hydrocarbons such as n-hexane, isohexane, n-nonane, isononane, dodecane and isododecane; unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,1,3,5,7-cyclooctatetraene; and cyclododecene; and aromatic hydrocarbons such as benzene, toluene and xylene.

In another preferred embodiment, the dispersion medium includes oil types of liquids, alone or in combination with organic solvent(s).

Suitable organic solvents include alcohols, ketones, esters, ethers, glycols and polyglycols and derivatives thereof, lactones, N-containing solvents such as amides, higher fatty acid ester and mixtures of one or more of the solvents as described above for solvent based dispersion media.

The amount of polar solvent is preferably lower than the amount of oil. The organic solvent preferably has a high boiling point, preferably above 200° C. Examples of suitable combinations are disclosed in EP 808347 A (XAAR TECHNOLOGY LTD) especially for the use of oleyl alcohol and in EP 1157070 A (MARCONI DATA SYSTEMS INC) for the combination of oil and volatile organic solvent.

Suitable oils include saturated hydrocarbons and unsaturated hydrocarbons, aromatic oils, paraffinic oils, extracted paraffinic oils, napthenic oils, extracted napthenic oils, hydrotreated light or heavy oils, vegetable oils, white oils, petroleum naptha oils, halogen-substituted hydrocarbons, silicones and derivatives and mixtures thereof.

Hydrocarbons may be selected from straight chain or branched-chain aliphatic hydrocarbons, alicyclic hydrocarbons and aromatic hydrocarbons. Examples of hydrocarbons are saturated hydrocarbons such as n-hexane, isohexane, n-nonane, isononane, dodecane and isododecane; unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,1,3,5,7-cyclooctatetraene; and cyclododecene; and aromatic hydrocarbons such as benzene, toluene, xylene, napthalene, phenanthrene, anthracene and derivatives thereof. In literature, the term paraffinic oil is often used. Suitable paraffinic oils can be normal paraffin type (octane and higher alkanes), isoparaffins (isooctane and higher iso-alkanes) and cycloparaffins (cyclooctane and higher cycloalkanes) and mixtures of paraffin oils. The term "liquid paraffin" is often used to refer to a mixture of mainly including three components of a normal paraffin, an isoparaffin and a monocyclic paraffin, which is obtained by highly refining a relatively volatile lubricating oil fraction through a sulphuric-acid washing or the like, as described in U.S. Pat. No. 6,730,153 (SAKATA INX CORP.). Suitable hydrocarbons are also described as de-aromatized petroleum distillates.

Suitable examples of halogenated hydrocarbons include methylene dichloride, chloroform, carbon tetrachloromethane and methyl chloroform. Other suitable examples of halogen-substituted hydrocarbons include perfluoro-alkanes, fluorine-based inert liquids and fluorocarbon iodides.

Suitable examples of silicone oils include dialkyl polysiloxane (e.g., hexanemethyl disiloxane, tetramethyl disiloxane, octamethyl trisiloxane, hexanemethyl trisiloxane, heptamethyl trisiloxane, decamethyl tetrasiloxane, trifluoropropyl heptamethyl trisiloxane, diethyl tetramethyl disiloxane), cyclic dialkyl polysiloxane (e.g., hexamethyl cyclotrisiloxane, octamethyl cyclotetrasiloxane, tetramethyl cyclotetrasiloxane, tetra(trifluoropropyl)tetramethyl cyclotetrasiloxane), and methylphenyl silicone oil.

White oil is a term used for white mineral oils, which are highly refined mineral oils that consist of saturated aliphatic and alicyclic non-polar hydrocarbons. White oils are hydrophobic, colorless, tasteless, odorless, and do not change color over time.

Vegetable oils include semi-drying oils such as soybean oil, cotton seed oil, sunflower oil, rape seed oil, mustard oil, sesame oil and corn oil; non-drying oils such as olive oil, peanut oil and tsubaki oil; and drying oils such as linseed oil and safflower oil, wherein these vegetable oils can be used alone or as a mixture thereof.

Examples of other suitable oils include petroleum oils, non-drying oils and semi-drying oils.

Commercially available suitable oils include the aliphatic hydrocarbons types such as the Isopar™ range (isoparaffins) and Varsol/Naphtha range from EXXON CHEMICAL, the Soltrol™ range and hydrocarbons from CHEVRON PHILLIPS CHEMICAL, and the Shellsol™ range from SHELL CHEMICALS.

Suitable commercial normal paraffins include the Norpar™ range from EXXON MOBIL CHEMICAL.

Suitable commercial napthenic hydrocarbons include the Nappar™ range from EXXON MOBIL CHEMICAL.

Suitable commercial de-aromatized petroleum distillates include the Exxsol™ D types from EXXON MOBIL CHEMICAL Suitable commercial fluoro-substituted hydrocarbons include fluorocarbons from DAIKIN INDUSTRIES LTD, Chemical Division.

Suitable commercial silicone oils include the silicone fluid ranges from SHIN-ETSU CHEMICAL, Silicone Division.

Suitable commercial white oils include Witco™ white oils from CROMPTON CORPORATION.

If the non-aqueous ink is a curable ink, the dispersion medium includes one or more monomers and/or oligomers to obtain a liquid dispersion medium. Sometimes, it can be advantageous to add a small amount of an organic solvent to improve the dissolution of the dispersant. The content of organic solvent should be lower than 20 wt % based on the total weight of the pigmented inkjet ink. In other cases, it can be advantageous to add a small amount of water, for example, to improve the spreading of the inkjet ink on a hydrophilic surface, but preferably the inkjet ink contains no water.

Preferred organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Suitable monomers and oligomers can be found in Polymer Handbook, Vol. 1+2, 4th Edition, edited by J. BRANDRUP, et al., Wiley-Interscience, 1999.

Suitable examples of monomers for curable pigmented inkjet inks include: acrylic acid, methacrylic acid, maleic acid (or their salts), maleic anhydride; alkyl(meth)acrylates (linear, branched and cycloalkyl) such as methyl(meth)acrylate, n-butyl(meth)acrylate, tert-butyl(meth)acrylate, cyclohexyl(meth)acrylate and 2-ethylhexyl(meth)acrylate; aryl(meth) acrylates such as benzyl(meth)acrylate and phenyl(meth) acrylate; hydroxyalkyl(meth)acrylates such as hydroxyethyl (meth)acrylate and hydroxypropyl(meth)acrylate; (meth) acrylates with other types of functionalities (e.g. oxirane, amino, fluoro, polyethylene oxide, phosphate-substituted) such as glycidyl (meth)acrylate, dimethylaminoethyl(meth) acrylate, trifluoroethyl acrylate, methoxypolyethyleneglycol (meth)acrylate and tripropyleneglycol(meth)acrylate phosphate; allyl derivatives such as allyl glycidyl ether; styrenics such as styrene, 4-methylstyrene, 4-hydroxystyrene, and 4-acetoxystyrene; (meth)acrylonitrile; (meth)acrylamides (including N-mono and N,N-disubstituted) such as N-benzyl (meth)acrylamide; maleimides such as N-phenyl maleimide, N-benzyl maleimide and N-ethyl maleimide; vinyl derivatives such as vinylcaprolactam, vinylpyrrolidone, vinylimidazole, vinylnaphthalene and vinyl halides; vinylethers such as vinylmethyl ether; and vinylesters of carboxylic acids such as vinylacetate and vinylbutyrate.

A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used.

Surfactants

The ink according to a preferred embodiment of the present invention may contain at least one surfactant. The surfactant(s) can be anionic, cationic, non-ionic, or zwitterionic and are usually added in a total quantity less than 20 wt % based on the total weight of the pigment dispersion and particularly in a total less than 10 wt % based on the total weight of the pigment dispersion.

Suitable surfactants include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Curable pigmented inks may contain a fluorinated or silicone compound as surfactant, however, a potential drawback is bleed-out after image formation because the surfactant does not cross-link. It is therefore preferred to use a copolymerizable monomer having surface-active effects, for example, silicone-modified acrylates, silicone modified methacrylates, fluorinated acrylates, and fluorinated methacrylates.

In a preferred embodiment, the curable pigmented inkjet inks contain a polyether modified poly-dimethyl-siloxane, with Byk™-333 available from BYK CHEMIE GMBH, being particularly preferred.

Biocides

Biocides are preferably added when the ink contains water. Suitable biocides for the ink prepared by the method according to a preferred embodiment of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Bronidox™ available from HENKEL and Proxel™ GXL available from AVECIA.

A biocide is preferably added in an amount of 0.001 to 3 wt %, more preferably 0.01 to 1.00 wt %, each based on the total weight of the ink.

pH Adjusters

The ink prepared by the method according to a preferred embodiment of the present invention may contain at least one pH adjuster. Suitable pH adjusters include NaOH, KOH, NEt$_3$, NH$_3$, HCl, HNO$_3$ and H$_2$SO$_4$. Preferred pH adjusters used in the preparation of precipitation dispersions are NaOH and H$_2$SO$_4$.

Binders

The ink according to a preferred embodiment of the present invention may contain at least one binder resin. The binder functions as a viscosity controlling agent and also provides fixability relative to the polymeric resin substrate, e.g., a polyvinyl chloride substrate, also called vinyl substrate. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstyrene copolymer resin. These binders may be used alone or in a mixture thereof. The binder is preferably a film-forming thermoplastic resin.

The amount of binder resin in an inkjet ink is preferably in the range of 0.1 to 30 wt %, more preferably 1 to 20 wt %, most preferably 2 to 10 wt % based on the total weight of the inkjet ink.

EXAMPLES

Materials

All materials used in the following examples were readily available from standard sources such as Aldrich Chemical Co. (Belgium) and Acros (Belgium) unless otherwise specified. The water used was deionized water. Hostaperm™ Red E5B02 is a magenta pigment (C.I. Pigment Violet 19) available from CLARIANT. Sunfast™ Blue 249-1284 is a cyan pigment (C.I. Pigment Blue 15:3) available from SUN CHEMICAL. PY120 is the abbreviation for C.I. Pigment Yellow 120 for which Novoperm™ Yellow H2G from Clariant was used. SOLSPERSE™ 32000 is a hyperdispersant from NOVEON. SOLSPERSE™ 5000 is a dispersion synergist from NOVEON. DEGDEE is diethyleneglycol diethylether from ACROS. DPGDA™ is dipropylene glycol diacrylate available from UCB. Sartomer™ SR9003 is a difunctional acrylate monomer available from SARTOMER Craynor™ CN386 is an amine modified acrylate synergist available from CRAY VALLEY. Byk™-333 is a surfactant available from BYK CHEMIE GMBH. Darocur™ ITX is a photo-initiator available from CIBA SPECIALTY CHEMICALS. Genorad™ 16 is a stabilizer available from Rahn AG. UCAR™ VYHH is a high molecular weight copolymer of vinyl chloride and vinyl acetate having 86% vinylchloride from DOW CHEMICAL Company.

Measurement Methods

1. Pigment Concentration in a Liquid

The pigment concentration in a liquid was determined by spectrophotometric measurements with an Agilent HP 8453 spectrophotometer. Where necessary, the samples were first diluted in order to be in a region measurable by the spectrophotometer. Generally, the samples were diluted so as to have an absorbance below 2.0. The dilution was in a region where the Beer-Lambert law can be used and the measured absorbance is then directly proportional to the concentration of the pigment. The absorbance was measured at the point of maximum absorption for the yellow, magenta and cyan pigments and at 500 nm for the black pigment. Prior to the measurement of the samples, a calibration curve for absorbance versus pigment concentration of the dispersions was made between 0 and 0.004% pigment concentration in weight.

2. Contamination of an Inkjet Ink

In manufacturing pigmented inkjet inks, it was experienced that the yellow inkjet ink was usually the most easily visibly contaminated ink. The maximum acceptable level of contamination of a yellow ink by other color pigments was determined by adding some well known amounts of the other inks to the yellow ink. The contamination level giving a ΔE94 value of 1 for the full density yellow ink on a Lab plot of a printed sample was determined. A ΔE94 value of 1 was observed for the yellow ink for adding 0.038 wt % of black pigment based upon the total weight of the yellow pigment. For the magenta and cyan ink, a larger amount of magenta pigment (0.157 wt %) or cyan pigment (0.045 wt %) was necessary to observe a ΔE94 value of 1 for the yellow ink.

In order to manufacture consistent inkjet inks, the inks should not be contaminated by other pigment(s) in a concentration of more than 0.03 wt % based upon the total weight of pigment(s) in the inkjet ink.

Preparation of Pigment Dispersions

All pigment dispersions and inkjet inks were prepared in the same way by performing the following steps:

1. A dispersion premix was prepared by mixing the liquid component(s) and solid components, such as the dispersant and one or more pigments, in a vessel and stirring the dispersion premix for 15 to 60 minutes.
2. The vessel containing the dispersion premix was then connected to a dispersing apparatus (ECM Poly from Willy A. Bachofen AG Machinenfabrik) through a pump, and the premix was circulated over the dispersing apparatus for a certain time.

3. At the end of the dispersion process, the dispersion was pumped (via the mill discharge) to a clean vessel where afterwards the other components of the inkjet ink were added to obtain the final ink composition.

Example 1

This example compares the manufacturing method of radiation curable inkjet inks using a standard cleaning operation with the method using a cleaning operation according to a preferred embodiment of the present invention.

Comparative Radiation Curable Inkjet Ink C-1

This comparative inkjet ink illustrates the manufacturing of a radiation curable magenta inkjet ink followed by a standard cleaning operation.

Dispersion Step 113 kg of the dispersion premix was prepared by mixing for 30 minutes the components according to Table 1 in a 250 L vessel. The vessel was then connected to a Bachofen ECM Poly mill filled for 65% with 0.4 mm yttrium stabilized zirconia beads. The total tubing length (internal diameter 17 mm) from vessel to pump, from pump to mill and from mill back to vessel was about 4 meter. The mixture was circulated over the mill for 9.25 hours at a flowrate of about 8 L per minute and a rotation speed in the mill of about 15 m/s. The dispersion was then discharged into a 500 L vessel.

TABLE 1

| Component | Quantity |
| --- | --- |
| Hostaperm ™ Red E5B02 | 20 wt % |
| SOLSPERSE ™ 32000 | 20 wt % |
| Genorad ™ 16 | 1 wt % |
| DPGDA ™ | 59 wt % |

Cleaning

The 250 L vessel was disconnected and replaced by a 60 L clean vessel. In a first step, 40 kg of MEK was put into the 60 L vessel and pumped through tubing and mill to a waste vessel. In a second step, 15 kg of DPGDA™ was put in the vessel and pumped through the mill to the waste vessel. At this stage the mill was believed to be ready for dispersing the next color pigment.

In order to assess how much pigment was still present in the mill and tubing circuitry, 20 kg of MEK was put in a 60 L vessel and circulated over the mill for about 10 minutes. A sample of the colored MEK solution was then used to determine the pigment concentration by spectrophotometry. It was found that about 1 gram of C.I. Pigment Violet 19 was still present in the milling circuit.

If the following inkjet ink to be prepared would be a yellow inkjet ink, then a 45 kg batch of pigment dispersion at 20 wt % of pigment would have been contaminated by 1 g of C.I. Pigment Violet 19 or 0.011 wt % based upon the total weight of the yellow pigment, which is well below the limit of 0.03 wt %.

If the standard cleaning operation would have been omitted, a much higher contamination would have been obtained in preparing the above yellow ink. From the 113 kg of dispersion premix charged into the dispersing apparatus only 109 kg of dispersion was collected in the 500 L vessel, meaning that about 4 kg of dispersion was "left" inside the dispersing apparatus. At a concentration of 20 wt % of C.I. Pigment Violet 19 in the pigment dispersion for preparing the comparative radiation curable inkjet ink C-1, about 800 g of pigment (and probably more) would have been present in the dispersing apparatus. Using the same 45 kg batch at 20 wt % of yellow pigment for preparing a yellow inkjet ink, a contamination of 3.54 wt % of C.I. Pigment Violet 19 based upon the total weight of the yellow pigment would have been obtained and thus a yellow inkjet ink of unacceptable quality would have been prepared.

Ink Preparation

The 109 kg of dispersion in the 500 L vessel is expected to have the composition in kg as given in Table 2. About 436 kg of the final ink composition can be made with the 109 kg of magenta dispersion. The last column of Table 2 gives the amount in kg of components to be added to the dispersion.

TABLE 2

| Components | Inkjet ink (wt %) | Dispersion (kg) | Inkjet ink (kg) | To add (kg) |
| --- | --- | --- | --- | --- |
| DPGDA ™ | 43.97 | 64.31 | 191.71 | 127.40 |
| Sartomer ™ SR9003 | 30.00 | — | 130.80 | 130.80 |
| Hostaperm ™ Red E5B02 | 5.00 | 21.80 | 21.80 | — |
| SOLSPERSE ™ 32000 | 5.00 | 21.80 | 21.80 | — |
| Darocur ™ ITX | 5.00 | — | 21.80 | 21.80 |
| Craynor ™ CN386 | 10.00 | — | 43.60 | 43.60 |
| Byk ™-333 | 0.03 | — | 0.13 | 0.13 |
| Genorad ™ 16 | 1.00 | 1.09 | 4.36 | 3.27 |
| Total | 100.00 | 109.00 | 436.00 | 327.00 |

Even when the amounts of components for completing the inkjet ink were compensated for the loss of pigment in the dispersion installation, fluctuations in pigment concentration have been observed in manufacturing the inkjet inks. To eliminate these fluctuations, one would have to perform a time-consuming and expensive verification of the pigment concentration in the pigment dispersion.

Inventive Radiation Curable Inkjet Ink I-1

This inventive inkjet ink I-1 illustrates the manufacturing of the same magenta inkjet ink as in the comparative radiation curable inkjet ink C-1 but now followed by a cleaning operation in accordance with a preferred embodiment of the present invention.

Dispersion Step 113 kg of the dispersion premix was prepared in the same way as for the comparative radiation curable inkjet ink C-1 and then discharged from the premix vessel into a 500 L vessel.

Cleaning

The dispersing installation, including the Bachofen ECM Poly mill and the dirty premix vessel, was cleaned by adding, in a first step, about 21.4 kg of DPGDA™ as washing liquid into the dirty premix vessel by help of a pump and tubing. The jet was oriented along the walls so as to clean them from the remaining dispersion. In a second step, the mixture of DPGDA™ and remaining dispersion was discharged through the tubing, pump and mill to the 500 L vessel containing the previously discharged pigment dispersion. Steps 1 and 2, here above, were repeated three times so that in total 4×21.4 or 85.6 kg of DPGDA™-washing liquid was used to clean the installation. The 85.6 kg of DPGDA™ was available from the ink formulation to clean the dispersing installation. At this stage the mill was ready for dispersing a next color pigment (only the premix vessel was taken away for further cleaning).

In order to assess how much pigment was still present in the mill and tubing circuitry, the premix vessel was disconnected and replaced by a clean 60 L vessel. Then, 20 kg of MEK was added to the 60 L vessel and circulated over the mill for about 10 minutes. A sample of the colored MEK solution was then used to determine the pigment concentration by spectrophotometry. It was found that 1.03 grams of C.I. Pigment Violet 19 was still present in the milling circuit.

If the following inkjet ink to be prepared would be a yellow inkjet ink, then a 45 kg batch of pigment dispersion at 20 wt % of pigment would have been contaminated by 1.03 g of C.I. Pigment Violet 19 or 0.011 wt % based upon the total weight of the yellow pigment, which is well below the limit of 0.03 wt %.

The amount of pigment contaminating the dispersion installation also gives an indication of what the minimum batch size of the next color should be to avoid too high contamination. For the above example, with 1.03 g of C.I. Pigment Violet 19 in the dispersion installation, the batch size should at least be 16.5 kg to meet the contamination limit of 0.03 wt %. However, as explained above, it was observed that yellow ink could withstand more contamination by a magenta ink than by a black ink. For a $\Delta E94$ value of 1, it was observed that 0.157 wt % of magenta pigment based upon the total weight of the yellow pigment could be added. With this contamination limit of 0.157 wt %, the batch size would only have to be 3.2 kg which is when considering the volume of mill and tubing in fact too small to effectively use the dispersing installation.

Ink Preparation

The 113 kg of dispersion in the 500 L vessel has the composition in kg as given in Table 3. A total of 452 kg of the final ink can be made with the 113 kg of magenta dispersion, which is 16 kg more than the comparative radiation curable inkjet ink C-1. The last column of Table 3 gives the amount in kg of components to be added to the dispersion, whereof 85.6 kg of the liquid component DPGDA™ was already used as washing liquid to clean the dispersing installation.

TABLE 3

| Components | Inkjet ink (wt %) | Dispersion (kg) | Inkjet ink (kg) | To add (kg) |
|---|---|---|---|---|
| DPGDA ™ | 43.97 | 66.67 | 198.74 | 132.07 -85.6 |
| Sartomer ™ SR9003 | 30.00 | — | 135.60 | 135.60 |
| Hostaperm ™ Red E5B02 | 5.00 | 22.60 | 22.60 | — |
| SOLSPERSE ™ 32000 | 5.00 | 22.60 | 22.60 | — |
| Darocur ™ ITX | 5.00 | — | 22.60 | 22.60 |
| Craynor ™ CN386 | 10.00 | — | 45.20 | 45.20 |
| Byk ™-333 | 0.03 | — | 0.14 | 0.13 |
| Genorad ™ 16 | 1.00 | 1.13 | 4.52 | 4.52 |
| Total | 100.00 | 113.00 | 452.00 | 254.52 |

Using the cleaning procedure according to a preferred embodiment of the present invention, a very consistent quality of this magenta inkjet ink has been observed. Since almost all of the pigment ends up in the final ink composition no fluctuations in pigment concentration have been observed in manufacturing this magenta inkjet ink. For the comparative radiation curable inkjet ink C-1 it can be seen by comparing with Table 1 that approximately 800 g of pigment was wasted. This would cause different pigment concentrations for each batch of ink made, but also includes a financial penalty as the pigment is usually the most expensive component in the ink. With the exception of 1.03 g, all of the 22.6 kg of pigment used to prepare the inventive radiation curable inkjet ink I-1 ended up in the final ink composition. The excellent consistency of the inks prepared according to the present preferred embodiment of the present invention eliminated the need to perform a time-consuming and expensive verification of the pigment concentration in the pigment dispersion.

Inventive Radiation Curable Inkjet Ink I-2

This inventive inkjet ink I-2 illustrates the manufacturing of a radiation curable cyan inkjet ink by preparing the pigment dispersion in the same dispersing installation which was just used to prepare a batch of magenta ink in the same manner as disclosed for inventive radiation curable inkjet ink I-1.

Dispersion Step 81 kg of the dispersion premix was prepared by mixing for 30 minutes the components according to Table 4 in a 250 L vessel. The vessel was then connected to a Bachofen ECM Poly mill filled for 65% with 0.4 mm yttrium stabilized zirconia beads. The total tubing length (internal diameter 17 mm) from vessel to pump, from pump to mill and from mill back to vessel was about 4 meters. The mixture was circulated over the mill for 6.3 hours at a flow rate of about 8 L per minute and a rotation speed in the mill of about 15 m/s. The dispersion was then discharged into a 500 L vessel.

TABLE 4

| Component | Quantity |
|---|---|
| Sunfast ™ Blue 249-1284 | 14.00 wt % |
| SOLSPERSE ™ 32000 | 14.00 wt % |
| SOLSPERSE ™ 5000 | 0.75 wt % |
| Genorad ™ 16 | 1.00 wt % |
| DPGDA ™ | 70.25 wt % |

Cleaning

The dispersing installation, including the Bachofen ECM Poly mill and the dirty premix vessel, was cleaned by adding, in a first step, about 23.5 kg of DPGDA™ as washing liquid into the dirty premix vessel by help of a pump and tubing. The jet was oriented along the walls so as to clean them from the remaining dispersion. In a second step, the mixture of DPGDA™ and remaining dispersion was discharged through the tubing, pump and mill to the 500 L vessel containing the previously discharged pigment dispersion. Steps 1 and 2, here above, were repeated four times so that in total 5×23.5 or 117.5 kg of DPGDA™ was used to clean the installation. The 117.5 kg of DPGDA™ was available from the ink formulation to clean the dispersing installation. At this stage the mill was ready for dispersing a next color pigment (only the premix vessel was taken away for further cleaning).

In order to assess how much pigment was still present in the mill and tubing circuitry, the premix vessel was disconnected and replaced by a clean 60 L vessel. Then, 20 kg of MEK was added to the 60 L vessel and circulated over the mill for about 10 minutes. A sample of the colored MEK solution was then used to determine the pigment concentration by spectrophotometry. It was found that about 0.55 grams of Sunfast Blue 15:3 was still present in the milling circuit.

If the following inkjet ink to be prepared would be a yellow inkjet ink, then a 45 kg batch of pigment dispersion at 20 wt % of pigment would have been contaminated by 0.55 g of Sunfast Blue 15:3 or 0.006 wt % based upon the total weight of the yellow pigment, which is well below the limit of 0.03 wt %.

Ink Preparation

The 81 kg of dispersion in the 500 L vessel has the composition in kg as given in Table 5. A total of 453.6 kg of final ink can be made with the 81 kg of cyan dispersion. The last column of Table 5 gives the amount in kg of components to be added to the dispersion, whereof 117.5 kg of the liquid component DPGDA™ was already used as washing liquid to clean the dispersing installation.

TABLE 5

| Components | Inkjet ink (wt %) | Dispersion (kg) | Inkjet ink (kg) | To add (kg) |
| --- | --- | --- | --- | --- |
| DPGDA ™ | 41.34 | 56.90 | 187.52 | 130.62 -117.50 |
| Sartomer ™ SR9003 | 40.00 | — | 181.44 | 181.44 |
| Sunfast ™ Blue 249-1284 | 2.50 | 11.34 | 11.34 | — |
| SOLSPERSE ™ 32000 | 2.50 | 11.34 | 11.34 | — |
| SOLSPERSE ™ 5000 | 0.13 | 0.61 | 0.61 | — |
| Darocur ™ ITX | 5.00 | — | 22.68 | 22.68 |
| Craynor ™ CN386 | 7.50 | — | 34.02 | 34.02 |
| Byk ™-333 | 0.03 | — | 0.14 | 0.14 |
| Genorad ™ 16 | 1.00 | 0.81 | 4.54 | 3.73 |
| Total | 100.00 | 81.00 | 453.63 | 255.12 |

In comparing inkjet printed samples, no contamination could be observed for the inventive radiation curable cyan inkjet ink I-2 by a magenta ink corresponding to the inventive radiation curable magenta inkjet ink I-1 previously prepared in the same dispersion installation.

Using the cleaning procedure according to the present preferred embodiment of the present invention, a very consistent quality of cyan inkjet inks has been observed.

Example 2

This example illustrates that a method of a preferred embodiment of the present invention is not restricted to a specific type of inkjet ink. It is shown how more consistent solvent-based inkjet inks can be manufactured with minimal waste.

Comparative Solvent Based Inkjet Ink C-2

This comparative inkjet ink C-2 illustrates the manufacturing of a solvent based magenta inkjet ink followed by a standard cleaning operation.

Dispersion Step 86.25 kg of the dispersion premix was prepared by mixing 55.20 kg of DEGDEE, 17.25 kg of the pigment Hostaperm™ Red E5B02 and 13.80 kg of SOLSPERSE™ 32000 for 30 minutes in a 250 L vessel. The vessel was then connected to a Bachofen ECM Poly mill filled for 65% with 0.4 mm yttrium stabilized zirconia beads. The total tubing length (internal diameter 17 mm) from vessel to pump, from pump to mill and from mill back to vessel was about 4 meters. The mixture was circulated over the mill for 12 hours at a flow rate of about 8 L per minute and a rotation speed in the mill of about 15 m/s. After 12 hours, another 28.75 kg of DEGDEE was added to the vessel to obtain the composition according to Table 6. The dispersion was mixed for 12 minutes and then discharged into a 500 L vessel.

TABLE 6

| Component | Quantity |
| --- | --- |
| Hostaperm ™ Red E5B02 | 15 wt % |
| SOLSPERSE ™ 32000 | 12 wt % |
| DEGDEE | 73 wt % |

At the end of the dispersion process, the mixture was discharged from premix vessel through the mill into a 500 L vessel. From the 115 kg of dispersion premix charged into the dispersing apparatus, 111 kg of dispersion was collected in the 500 L vessel, meaning that about 4 kg of dispersion was "left" inside the dispersing apparatus.

Cleaning

The 250 L premix vessel was disconnected and replaced by a 60 L clean vessel. In a first step, 40 kg of MEK was put into the 60 L vessel and pumped through tubing and mill to a waste vessel. In a second step, 25 kg of DEGDEE was put in the vessel and pumped through the mill to the waste vessel. At this stage the mill was believed to be ready for dispersing the next color pigment.

In order to assess how much pigment was still present in the mill and tubing circuitry, 20 kg of MEK was put in a 60 L vessel and circulated over the mill for about 10 minutes. A sample of the colored MEK solution was then used to determine the pigment concentration by spectrophotometry. It was found that less than 0.5 grams of C.I. Pigment Violet 19 was still present in the milling circuit.

Ink Preparation

The 111 kg of dispersion in the 500 L vessel has the composition in kg as given in Table 7. A total of 416.25 kg of final ink can be made with the 111 kg of magenta dispersion. The last column of Table 7 gives the amount in kg of components to be added to the dispersion.

TABLE 7

| Components | Inkjet ink (wt %) | Dispersion (kg) | Inkjet ink (kg) | To add (kg) |
| --- | --- | --- | --- | --- |
| DEGDEE | 91.75 | 81.03 | 381.91 | 300.88 |
| UCAR ™ VYHH | 1.00 | — | 4.16 | 4.16 |
| Hostaperm ™ Red E5B02 | 4.00 | 16.65 | 16.65 | — |
| SOLSPERSE ™ 32000 | 3.20 | 13.32 | 13.32 | — |
| Byk ™-333 | 0.05 | — | 0.21 | 0.21 |
| Total | 100.00 | 111.00 | 416.25 | 305.25 |

Table 7 shows that approximately 600 g of pigment was wasted for the comparative solvent based inkjet ink C-2.

Inventive Solvent Based Inkjet Ink I-3

The inventive inkjet ink I-3 illustrates the manufacturing of the same magenta inkjet ink as in the comparative solvent based inkjet ink C-2 but now followed by a cleaning operation in accordance with a preferred embodiment of the present invention.

Dispersion Step 115 kg of the dispersion premix was prepared in the same way as for the comparative solvent based inkjet ink C-2 and then discharged from the premix vessel into a 500 L vessel.

Cleaning

The dispersing installation, including the Bachofen ECM Poly mill and the dirty premix vessel, was cleaned by adding, in a first step, about 20.1 kg of DEGDEE as washing liquid into the dirty premix vessel by help of a pump and tubing. The jet was oriented along the walls so as to clean them from the remaining dispersion. In a second step, the mixture of DEGDEE and remaining dispersion was discharged through the tubing, pump and mill to the 500 L vessel containing the previously discharged pigment dispersion. Steps 1 and 2, here above, were repeated two times so that in total 3×20.1 or 60.3 kg of DEGDEE was used as washing liquid to clean the installation. The 60.3 kg of DEGDEE was available from the ink formulation to clean the dispersing installation. At this stage the mill was ready for dispersing a next color pigment (only the premix vessel was taken away for further cleaning).

In order to assess how much pigment was still present in the mill and tubing circuitry, 20 kg of MEK was put in a 60 L vessel and circulated over the mill for about 10 minutes. A sample of the colored MEK solution was then used to determine the pigment concentration by spectrophotometry. It was found that about 0.41 grams of C.I. Pigment Violet 19 was still present in the milling circuit.

If the following inkjet ink to be prepared would be a yellow inkjet ink, then a 45 kg batch of pigment dispersion at 20 wt % of pigment would have been contaminated by 0.41 g of Hostaperm™ Red E5B02 or 0.0009 wt % based upon the total weight of the yellow pigment, which is well below the limit of 0.03 wt %.

Ink Preparation

The 115 kg of dispersion in the 500 L vessel has the composition in kg as given in Table 8. A total of 431.25 kg of the final ink can be made with the 115 kg of magenta dispersion, which is 20 kg more than the comparative solvent based inkjet ink C-2. The last column of Table 8 gives the amount in kg of components to be added to the dispersion, whereof 60.3 kg of the liquid component DEGDEE was already used as washing liquid to clean the dispersing installation.

TABLE 8

| Components | Inkjet ink (wt %) | Dispersion (kg) | Inkjet ink (kg) | To add (kg) |
| --- | --- | --- | --- | --- |
| DEGDEE | 91.75 | 83.95 | 395.67 | 311.72 −60.30 |
| UCAR ™ VYHH | 1.00 | — | 4.31 | 4.31 |
| Hostaperm ™ Red E5B02 | 4.00 | 17.25 | 17.25 | — |
| SOLSPERSE ™ 32000 | 3.20 | 13.80 | 13.80 | — |
| Byk ™-333 | 0.05 | — | 0.22 | 0.22 |
| Total | 100.00 | 115.00 | 431.25 | 255.95 |

Using the cleaning procedure according to the present preferred embodiment of the present invention, a very consistent quality of this magenta inkjet ink has been observed. With the exception of 0.41 g, all of the 17.25 kg of pigment used to prepare the inventive solvent based inkjet ink I-3 ended up in the final ink composition. The excellent consistency of the inks prepared according to the present preferred embodiment of the present invention eliminated the need to perform a time-consuming and expensive verification of the pigment concentration in the pigment dispersion.

Inventive Solvent Based Inkjet Ink I-4

This inventive inkjet ink I-4 illustrates the manufacturing of the same magenta inkjet ink as in the inventive solvent based inkjet ink I-3 but now followed by an even more thorough cleaning operation.

Dispersion Step 115 kg of the dispersion premix was prepared in the same way as for the comparative solvent based inkjet ink C-2 and then discharged from the premix vessel into a 500 L vessel.

Cleaning

The dispersing installation, including the Bachofen ECM Poly mill and the dirty premix vessel, was cleaned by adding, in a first step, about 20.1 kg of DEGDEE as washing liquid into the dirty premix vessel by help of a pump and tubing. The jet was oriented along the walls so as to clean them from the remaining dispersion. In a second step, the mixture of DEGDEE and remaining dispersion was discharged through the tubing, pump and mill to the 500 L vessel containing the previously discharged pigment dispersion. Steps 1 and 2, here above, were repeated four times so that in total 5×20.1 or 100.5 kg of DEGDEE was used to clean the installation. The 100.5 kg of DEGDEE was available from the ink formulation to clean the dispersing installation.

In order to assess how much pigment was still present in the mill and tubing circuitry, 20 kg of MEK was put in a 60 L vessel and circulated over the mill for about 10 minutes. A sample of the colored MEK solution was then used to determine the pigment concentration by spectrophotometry. It was found that only about 0.14 grams of C.I. Pigment Violet 19 was still present in the milling circuit.

If the following inkjet ink to be prepared would be a yellow inkjet ink, then a 45 kg batch of pigment dispersion at 20 wt % of pigment would have been contaminated by 0.14 g of Hostaperm™ Red E5B02 or 0.0003 wt % based upon the total weight of the yellow pigment, which is 100 times below the limit of 0.03 wt %.

Ink Preparation

The 115 kg of dispersion in the 500 L vessel has the composition in kg as given in Table 9. A total of 431.25 kg of the final ink can be made with the 115 kg of magenta dispersion, which is 15 kg more than the comparative solvent based inkjet ink C-2. The last column of Table 9 gives the amount in kg of components to be added to the dispersion, whereof 100.50 kg of the liquid component DEGDEE was already used to clean the dispersing installation.

TABLE 9

| Components | Inkjet ink (wt %) | Dispersion (kg) | Inkjet ink (kg) | To add (kg) |
| --- | --- | --- | --- | --- |
| DEGDEE | 91.75 | 83.95 | 395.67 | 311.72 −100.50 |
| UCAR ™ VYHH | 1.00 | — | 4.31 | 4.31 |
| Hostaperm ™ Red E5B02 | 4.00 | 17.25 | 17.25 | — |
| SOLSPERSE ™ 32000 | 3.20 | 13.80 | 13.80 | — |
| Byk ™-333 | 0.05 | — | 0.22 | 0.22 |
| Total | 100.00 | 115.00 | 431.25 | 215.75 |

No difference in quality could be observed between the inventive solvent based inkjet inks I-3 and I-4.

Inventive Solvent Based Inkjet Ink I-5

This inventive inkjet ink I-5 illustrates the manufacturing of a solvent based yellow inkjet ink by preparing the pigment dispersion in the same dispersing installation which was just used to prepare a batch of magenta ink in the same manner as disclosed for inventive radiation curable inkjet ink I-3.

Dispersion Step 86.25 kg of the dispersion premix was prepared by mixing 51.75 kg of DEGDEE, 17.25 kg of the pigment PY120 and 17.25 kg of SOLSPERSE™ 32000 for 30 minutes in a 250 L vessel. The vessel was then connected to a Bachofen ECM Poly mill filled for 65% with 0.4 mm yttrium stabilized zirconia beads. The total tubing length (internal diameter 17 mm) from vessel to pump, from pump to mill and from mill back to vessel was about 4 meters. The mixture was circulated over the mill for 12 hours at a flowrate of about 8 L per minute and a rotation speed in the mill of about 15 m/s. After 12 hours another 28.75 kg of DEGDEE was added to the vessel to obtain the composition according to Table 10. The dispersion was mixed for 12 minutes and then discharged into a 500 L vessel.

TABLE 10

| Component | Quantity |
| --- | --- |
| PY120 | 15 wt % |
| SOLSPERSE ™ 32000 | 15 wt % |
| DEGDEE | 70 wt % |

At the end of the dispersion process, the mixture was discharged from premix vessel through the mill into a 500 L vessel.

Cleaning

The dispersing installation, including the Bachofen ECM Poly mill and the dirty premix vessel, was cleaned by adding, in a first step, about 20.1 kg of DEGDEE as washing liquid into the dirty premix vessel by help of a pump and tubing. The jet was oriented along the walls so as to clean them from the remaining dispersion. In a second step, the mixture of DEGDEE and remaining dispersion was discharged through the tubing, pump and mill to the 500 L vessel containing the previously discharged pigment dispersion. Steps 1 and 2, here above, were repeated two times so that in total 3×20.1 or 60.3 kg of DEGDEE was used as washing liquid to clean the installation. The 60.3 kg of DEGDEE was available from the ink formulation to clean the dispersing installation. At this stage the mill was ready for dispersing a next color pigment (only the premix vessel was taken away for further cleaning).

In order to assess how much pigment was still present in the mill and tubing circuitry, 20 kg of MEK was put in a 60 L vessel and circulated over the mill for about 10 minutes. A sample of the colored MEK solution was then used to determine the pigment concentration by spectrophotometry. It was found that about 0.21 grams of C.I. Pigment Yellow 120 was still present in the milling circuit.

Ink Preparation

The 115 kg of dispersion in the 500 L vessel has the composition in kg as given in Table 11. A total of 431.25 kg of the final ink can be made with the 115 kg of yellow pigment dispersion. The last column of Table 11 gives the amount in kg of components to be added to the dispersion, whereof 60.3 kg of the liquid component DEGDEE was already used as washing liquid to clean the dispersing installation.

TABLE 11

| Components | Inkjet ink (wt %) | Dispersion (kg) | Inkjet ink (kg) | To add (kg) |
| --- | --- | --- | --- | --- |
| DEGDEE | 90.90 | 80.50 | 392.01 | 311.51 −60.30 |
| UCAR ™ VYHH | 1.00 | — | 4.31 | 4.31 |
| PY120 | 4.00 | 17.25 | 17.25 | — |
| SOLSPERSE ™ 32000 | 4.00 | 17.25 | 17.25 | — |
| Byk ™-333 | 0.10 | — | 0.43 | 0.43 |
| Total | 100.00 | 115.00 | 431.25 | 255.95 |

In comparing inkjet printed samples, no contamination could be observed for the inventive solvent based yellow inkjet ink I-5 from a magenta ink corresponding to the inventive radiation curable magenta inkjet ink I-3 previously prepared in the same dispersion installation.

Using the cleaning procedure according to the present preferred embodiment of the present invention, a very consistent quality of yellow inkjet inks has been observed.

Example 3

This example illustrates that the contamination in a dispersing installation is gradually reduced by repeating the charging and cleaning of the installation with a washing liquid.

Samples were taken from the final portion of the washing liquids used in the cleaning operation of the inventive inkjet ink I-4 before being discharged in the vessel containing the pigment dispersion. In observing the flow of the washing liquid into the vessel, it is believed that the washing liquid is not homogenous in pigment concentration. The results of the analysis on pigment concentration are listed in Table 12.

TABLE 12

| Step | Washing liquid | Hostaperm ™ Red E5B02 mg per g washing liquid |
| --- | --- | --- |
| Cleaning step 1 | 20.1 kg DEGDEE | 1.0300 |
| Cleaning step 2 | 20.1 kg DEGDEE | 0.0366 |
| Cleaning step 3 | 20.1 kg DEGDEE | 0.0054 |
| Cleaning step 4 | 20.1 kg DEGDEE | 0.0022 |
| Cleaning step 5 | 20.1 kg DEGDEE | 0.0025 |

As one can see, the drop in pigment concentration was the largest between step 1 and step 2. The reason was that during step 1 the walls of the circulation vessel were the dirtiest (dispersion remaining), so that the concentration at the outlet of the mill will be the highest. In step 2 there was still some product coming off the wall, which again means the concentration after this washing step could not decrease very much. From step 3 on, the walls were clean and the concentration decreased further.

It was observed in making pigment dispersions that cleaning in one step with a larger volume is not as efficient as cleaning in multiple steps with smaller volumes.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:
1. A method for manufacturing a pigmented ink comprising the steps of:
 a) preparing a pigment dispersion in a dispersing installation and discharging the pigment dispersion from the dispersing installation;
 b) washing the dispersing installation by charging the dispersing installation with a washing liquid;
 c) discharging the washing liquid from the dispersing installation; and d) adding the discharged washing liquid to the pigment dispersion; wherein the washing liquid of step b) includes at least one liquid component of the ink.

2. The method according to claim 1, wherein steps b), c), and d) are repeated at least once.

3. The method according to claim 1, wherein steps b), c), and d) are repeated two, three, or four times.

4. The method according to claim 1, wherein the charged washing liquid in the washing step is circulated over the dispersing installation before being discharged.

5. The method according to claim 1, wherein the washing liquid consists of one liquid component of the ink.

6. The method according to claim 1, wherein the dispersing installation includes a mixing apparatus and a dispersing apparatus.

7. The method according to claim 6, wherein the mixing apparatus is selected from the group consisting of a pressure kneader, an open kneader, a planetary mixer, and a dissolver.

8. The method according to claim 6, wherein the dispersing apparatus is selected from the group consisting of horizontal mills, vertical mills, attritors, vibratory mills, ball mills, planetary ball mills, pearl mills, colloid mills, hammer mills, pin disk mills, double rollers, bead mills, ultrasonic mills, paint conditioners, and triple rollers.

9. The method according to claim 1, wherein the pigment dispersion is prepared using ultrasonic energy.

10. The method according to claim 1, wherein the pigment dispersion is prepared by precipitation.

11. The method according to claim 1, wherein the ink is an aqueous ink, a solvent-based ink, or a curable ink.

12. The method according to claim 11, wherein the ink contains at least one thermal initiator or a photo-initiator.

13. The method according to claim 12, wherein the ink is an inkjet ink.

* * * * *